United States Patent
Barrenscheen et al.

(10) Patent No.: US 7,017,072 B1
(45) Date of Patent: Mar. 21, 2006

(54) PROTECTION CIRCUIT FOR AN ACCESS-ARBITRATED BUS SYSTEM NETWORK

(75) Inventors: Jens Barrenscheen, Munich (DE); Mario Keil, Munich (DE); Hermann Kern, Mammendorf (DE); Andreas Pechlaner, Babensham (DE)

(73) Assignee: Infineon Technologies AG, Munich (DE)

( * ) Notice: Subject to any disclaimer, the term of this patent is extended or adjusted under 35 U.S.C. 154(b) by 257 days.

(21) Appl. No.: 10/089,650

(22) PCT Filed: Sep. 26, 2000

(86) PCT No.: PCT/EP00/09412

§ 371 (c)(1),
(2), (4) Date: Aug. 14, 2002

(87) PCT Pub. No.: WO01/24013

PCT Pub. Date: Apr. 5, 2001

(51) Int. Cl.
*G06F 11/00* (2006.01)

(52) U.S. Cl. ............................................ 714/4; 714/43

(58) Field of Classification Search .................. 714/4, 714/43, 56
See application file for complete search history.

(56) References Cited

U.S. PATENT DOCUMENTS

| 5,534,848 | A | | 7/1996 | Steele et al. ................. 340/517 |
| 5,903,565 | A | | 5/1999 | Neuhaus et al. ............. 370/402 |
| 5,999,389 | A | * | 12/1999 | Luebke et al. ................ 361/68 |
| 6,115,831 | A | * | 9/2000 | Hanf et al. .................... 714/43 |
| 6,396,282 | B1 | | 5/2002 | Minuth et al. ............... 324/509 |
| 2004/0165888 | A1 | * | 8/2004 | Gerstel et al. ................ 398/45 |

FOREIGN PATENT DOCUMENTS

| DE | 197 33 760 A1 | 3/1999 |
| DE | 198 33 462 | 1/2000 |
| JP | 61224726 A * | 10/1986 |
| WO | WO 95/24087 | 9/1995 |

* cited by examiner

*Primary Examiner*—Scott Baderman
(74) *Attorney, Agent, or Firm*—Fish & Richardson P.C.

(57) ABSTRACT

The invention relates to a protection circuit (12) for an access-arbitrated bus system network, comprising a fault detection device for detecting a fault status in a sub-network of the overall bus system network; and a separating device for separating the sub-network from the overall network when a fault status is detected in said sub-network.

5 Claims, 4 Drawing Sheets

PROTECTION CIRCUIT FOR AN ACCESS-ARBITRATED BUS SYSTEM NETWORK

The invention relates to a protective circuit for an access arbitrated bus system network for isolating a faulty network section from the overall network.

A bus comprises a plurality of parallel lines for data transmission which connect various functional units in a multiplex mode. On a bus, a plurality of functional units can receive data simultaneously, but only one functional unit can serve as a sender of information data at any particular time. An access arbitrated bus system is a bus system in which a plurality of users have transmission authority for transmission to the bus, the current transmission authorization being defined by the bus access. Examples of access arbitrated bus systems are CAN bus systems (CAN: Controller Area Network), J 1850 bus systems or bus systems operating on the basis of the CSMA method. The CSMA method (CSMA: Carrier Sense Multiple Access) is an access method for access with equal authorization to a plurality of stations or control nodes connected to the bus.

The CAN bus system is a bus system network, covering an area, for connecting locally disposed control nodes which is increasingly being used in vehicles, in particular. The individual control nodes are connected to one another via the CAN bus system and can interchange data frames via the bus lines. In this context, the data frames have a functional identification which identifies the vehicle function addressed, such as oil, brake, light or the like. One option for fault monitoring is to ascertain a particular CAN control node which is provided for controlling a particular vehicle control function and monitors the bus lines to determine whether an associated data frame is available for this function. If the CAN control node does not receive the required information within a particular time period, an emergency mode is activated.

FIG. 1 shows a CAN bus system based on the prior art. As per the example shown in FIG. 1, the CAN bus system comprises three CAN control nodes CAN1, CAN2, CAN3 which are connected by means of connecting lines a1, b1, a2, b2, a3, b3 to a first CAN bus line having a low level CANL and to a second CAN bus line having a high level CANH. The voltage level difference between the high level bus line CANH and the low level bus line CANL reproduces the transmitted information. As soon as the level difference exceeds a particular voltage threshold value, this is interpreted as a logic high bit, and as soon as the voltage level difference falls below a threshold value, this is interpreted as a logic low bit.

Various fault states can arise in the CAN bus system, namely a short circuit between the two CAN bus lines, a short circuit between one of the two bus lines CANL or CANH and ground, and a short circuit between one of the two bus lines CANL, CANH and a supply voltage $V_{BB}$. If the CAN bus system based on the prior art, as shown in FIG. 1, is installed in a motor vehicle, the various fault states can be caused by an accident. If, by way of example, the control node CAN1 is a control node for a distance radar situated in the vehicle's bumper, an accident involving a collision may result in a short circuit between the two connecting lines a1, b1. This fault state is recognized by all the control nodes in the bus system, which prevents further data interchange via the bus.

It is therefore the object of the present invention to provide a protective circuit for an access arbitrated bus system network which prevents failure of the overall bus system network in the event of a short circuit occurring on a bus line.

The invention achieves this object by means of a protective circuit having the features specified in patent claim 1.

The invention provides a protective circuit for an access arbitrated bus system network having:
a fault recognition device for recognizing a fault state in a network section in the overall bus system network and having
an isolation device for isolating the network section from the overall bus system network when a fault state is recognized in the network section.

Preferred developments of the inventive protective circuit are specified in the subordinate subclaims.

In one preferred development of the inventive protective circuit, the fault recognition device monitors voltage levels on the bus lines in the bus system network in order to recognize a fault state.

This affords the particular advantage that the network section recognized as being faulty is isolated with a very short reaction time, since physical voltage levels are monitored directly and no long-lasting transmission protocol queries are made.

The isolation device is preferably a logic isolation circuit which uses logic to isolate the network section recognized as being faulty from the rest of the bus system network.

The logic isolation circuit isolates the network section recognized as being faulty from the bus system preferably by blocking the dominant transmission signal from or to the network section.

In one preferred development of the inventive protective circuit, the logic isolation circuit is connected to the rest of the control nodes in the bus system network via a fault bus, the fault bus providing the control nodes with information data indicating that the network section recognized as being faulty is isolated from the overall bus system network.

In another preferred development of the inventive protective circuit, the fault recognition device has a first fault state detection circuit for detecting a fault state in a first network section, a second fault state detection circuit for detecting a physical fault state in a second network section and a fault recognition logic circuit which is connected to the two fault state detection circuits and outputs a control signal to the isolation device for the purposes of isolating the two network sections when a fault state is detected by one of the two fault state detection circuits.

The isolation device is preferably a switching device for switching the bus lines in the bus system network.

In another preferred development of the inventive protective circuit, the fault recognition logic circuit is connected to control nodes in the bus system network via a fault bus, the fault bus providing the control nodes with information data indicating that the network section recognized as being faulty is isolated from the overall bus system network.

In another preferred development of the inventive protective circuit, the protective circuit has a first transceiver for connection to a first network section, a second transceiver for second connection to a second network section, and a logic isolation circuit, where the transceiver receiver in the first transceiver is provided for recognizing a fault state in the first network section, and the transceiver receiver in the second transceiver is provided for recognizing a fault state in the second network section, and where the logic isolation circuit has logic inputs connected to the transceiver receivers and logic outputs connected to the transceiver transmitters.

In one preferred embodiment of the inventive protective circuit, the logic isolation circuit has two reception multiplexers, whose first input is respectively connected to a transceiver receiver and whose second input respectively has a logically recessive transmission signal applied to it, and two transmission multiplexers, whose output is respectively connected to a transceiver transmitter, whose first input is respectively connected to the output of the reception multiplexer in the transceiver receiver in the other transceiver and whose second input respectively has a logically recessive transmission signal applied to it.

Preferably, the first input of a transmission multiplexer is connected to the output of a reception multiplexer with DC decoupling.

In one preferred embodiment, the first input of the transmission multiplexer and the output of the reception multiplexer are respectively DC-decoupled by an interposed optocoupler.

The inventive protective circuit is preferably provided for a CAN bus system, a J 1850 bus system or a CSMA bus system.

In one preferred development of the inventive protective circuit, the fault recognition device recognizes as fault states short circuits between the lines in a network section, short circuits between the lines in the network section and ground, and short circuits between the lines in a network section and a supply voltage.

In one preferred development of the inventive protective circuit, the fault recognition device recognizes the termination of a fault state in a network section and actuates the isolation device to remove the isolation between the network sections and the overall bus system.

Preferred embodiments of the inventive protective circuit are described below with reference to the appended drawings in order to explain features which are fundamental to the invention.

Figure 1:
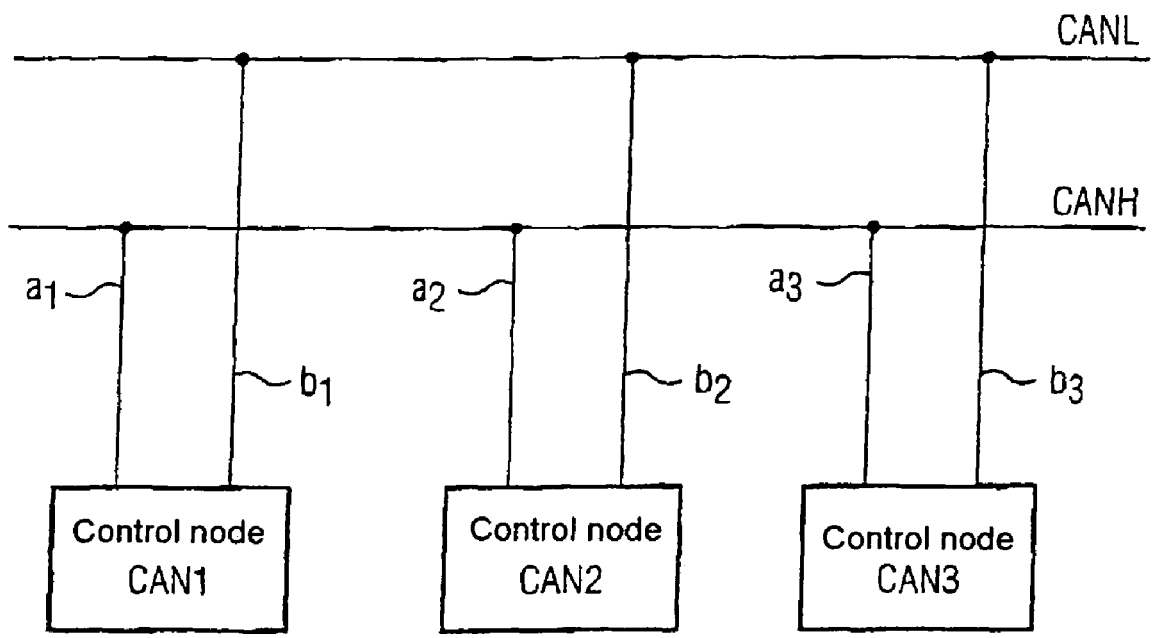
FIG. 1 shows a CAN network based on the prior art.
Figure 2:
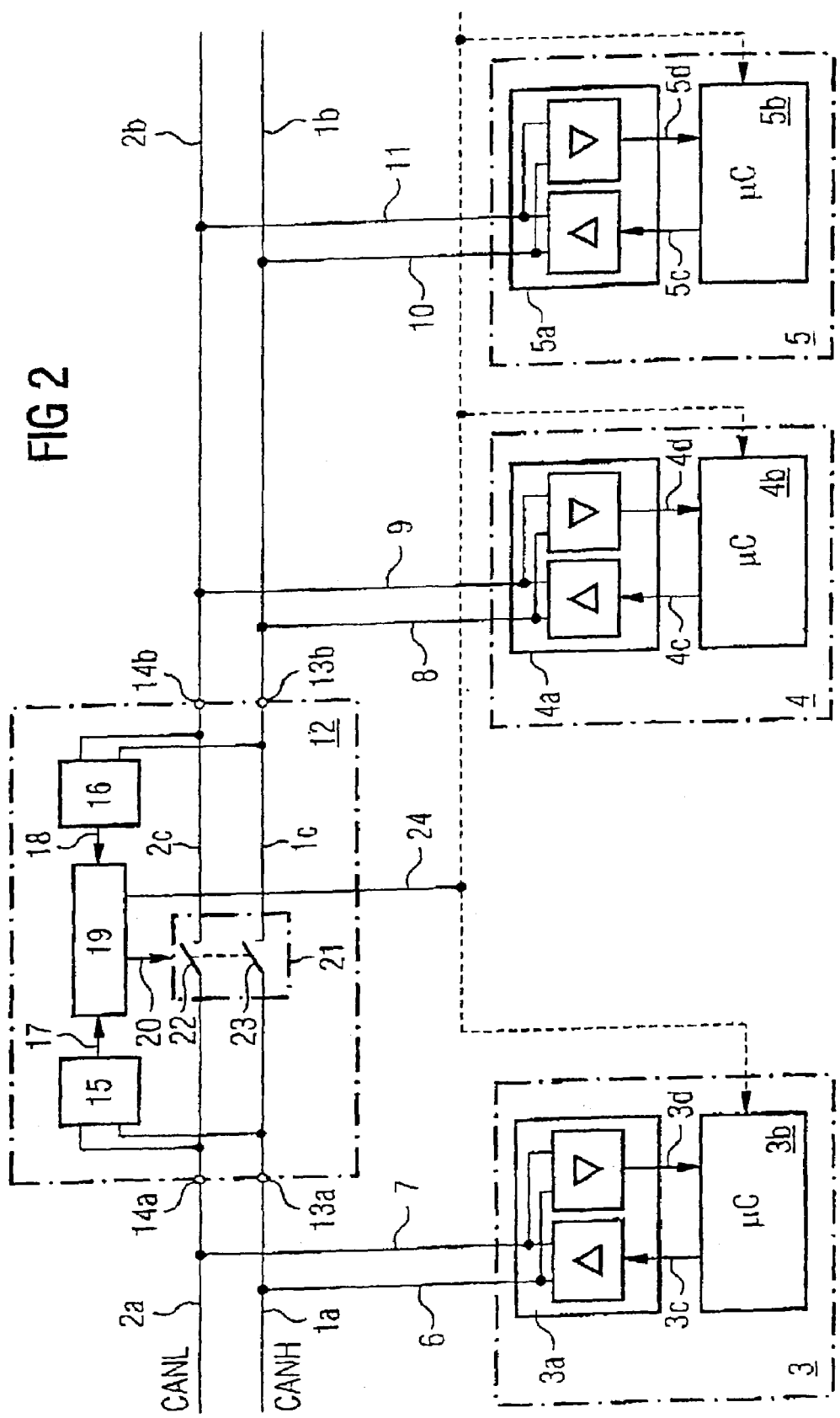
FIG. 2 shows a CAN bus system network with a first embodiment of the inventive protective circuit.

As can be seen in FIG. 2, the CAN bus system network comprises two CAN bus lines, namely a high level CAN bus line 1a, 1b (CAN-H) and a low level CAN bus line 2a, 2b (CAN-L). In the example shown in FIG. 2, the overall bus system network has three CAN control nodes 3, 4, 5. Each of the three control nodes 3, 4, 5 has a respective transceiver 3a, 4a, 5a and a microprocessor 3b, 4b, 5b. The transceivers 3a, 4a, 5a respectively comprise a transceiver transmitter and a transceiver receiver, with the transceiver transmitter being connected to the microprocessor via a respective transmission line 3c; 4c, 5c, and the transceiver receiver being connected to the microprocessor via a line 3d, 4d, 5d. The CAN bus lines 1a, 2a, 1b, 2b are connected to the control node 3 via control node connecting lines 6, 7, to the control node 4 via connecting lines 8, 9 and to the control node 5 via connecting lines 10, 11.

Connected into the CAN bus lines 1a, 1b, 2a, 2b is an inventive protective circuit 12 for the CAN bus system network on the basis of a first embodiment. The interposition of the protective circuit 12 in the overall bus system network subdivides said network into two network sections in the example shown in FIG. 2. The first network section comprises the control node 3, the connecting lines 6, 7 for the control node 3 and the CAN bus lines 1a, 2a, to which bus line connections 13a, 14a for the inventive protective circuit 12 are connected. The second network section is formed by the two CAN control nodes 4, 5, which are connected to the CAN bus lines 1b, 2b via connecting lines 8, 9 and 10, 11. The CAN bus lines 1b, 2b are connected to CAN bus line connections 13b, 14b for the inventive protective circuit 12.

In the inventive protective circuit 12 based on the first embodiment, the fault recognition device has a first fault state detection circuit 15 for detecting a fault state in the first network section and a second fault state detection circuit 16 for detecting a fault state in the second network section. The outputs of the two fault state detection circuits 15, 16 are connected to a fault recognition logic circuit 19 via lines 17, 18. When a fault state is detected in one of the two network sections by one of the two fault state detection circuits 15, 16 the fault recognition logic circuit 19 outputs a control signal via a control switching line 20 to a switching device 21 for the purpose of switching internal bus lines 1c, 2c within the protective circuit 12, the internal bus lines 1c, 2c respectively connecting the bus line connections 14a, 14b and 13a, 13b to one another. The switching device 21 has a plurality of switches 22, 23 connected in parallel, with a respective switch being provided for each bus line 1c, 2c. The switches 22, 23 are preferably semiconductor switches which block in both signal directions in the off state. The semiconductor switches preferably comprise two reverse-connected series MOSFET transistors whose forward resistance is less than 10 Ω.

The fault state detection circuits 15, 16 detect short circuits between the lines in a network section, for example between the connecting lines 6, 7 for the control node 3 in the first network section, as a first fault state.

In the example shown in FIG. 2, the first network ection can be a network section which is arranged in the external region of a vehicle body. In this case, an accident may result in a short circuit between the connecting lines 6, 7 for the control node 3. This short circuit is detected by the fault state detection circuit 15 using resistors (not shown) In addition, the two fault state detection circuits 15, 16 recognize as a second fault state a short circuit between the bus lines in the two network sections and ground or earth, and a short circuit between the bus lines in the two network sections and a supply voltage $V_{BB}$.

The two fault state detection circuits 15, 16 detect a fault state which has arisen in one of the two network sections by directly monitoring physical voltage levels, and not using bus data protocol queries. This means that a fault state which has arisen can be detected very quickly, and the two network sections are isolated from one another by the inventive protective circuit 12 within a very short reaction time of below 10 µs.

The fault recognition logic circuit 19 receives fault recognition signals from the two fault state detection circuits 15, 16 via the control lines 17, 18 and performs a logic OR operation. As soon as a fault state arises in one of the two network sections, the two switches 22, 23 in the switching device 21 are turned off by the fault recognition logic circuit via the switching control line 20, and the two network sections are isolated from one another.

When the two switches 22, 23 have been turned off and the two network sections have been isolated, the fault recognition device in the inventive protective circuit 12 can recognize in which of the two network sections the fault state has occurred. If the fault state detection circuit 15 continues to output a fault state detection signal to the fault recognition logic circuit 19 via the line 17 after the two switches 22, 23 have turned off, while at the same time the fault state detection circuit 16 outputs no fault recognition signal to the fault recognition logic circuit 19 via the fault recognition line 18, then the fault recognition logic circuit 19 recognizes that the fault state has arisen in the first network section. If, conversely, the fault state detection circuit 15 reports no fault state after the switches 22, 23 have turned off, while at the same time the fault state detection circuit 16 continues to report a fault state, the fault recognition logic circuit 19 recognizes that the fault has arisen in the second network section.

The fault recognition logic circuit 19 is preferably connected to the microprocessors 3b, 4b, 5b in the CAN control nodes 3, 4, 5 via an additional fault bus line 24. The fault bus line 24 provides the control nodes 3, 4, 5 in the two network sections with information data indicating that a network section recognized as being faulty is isolated from the overall bus system network. With a multiplicity of network sections, the control nodes are additionally informed about which network section has had the fault state arise in it on a local basis.

Figure 3:
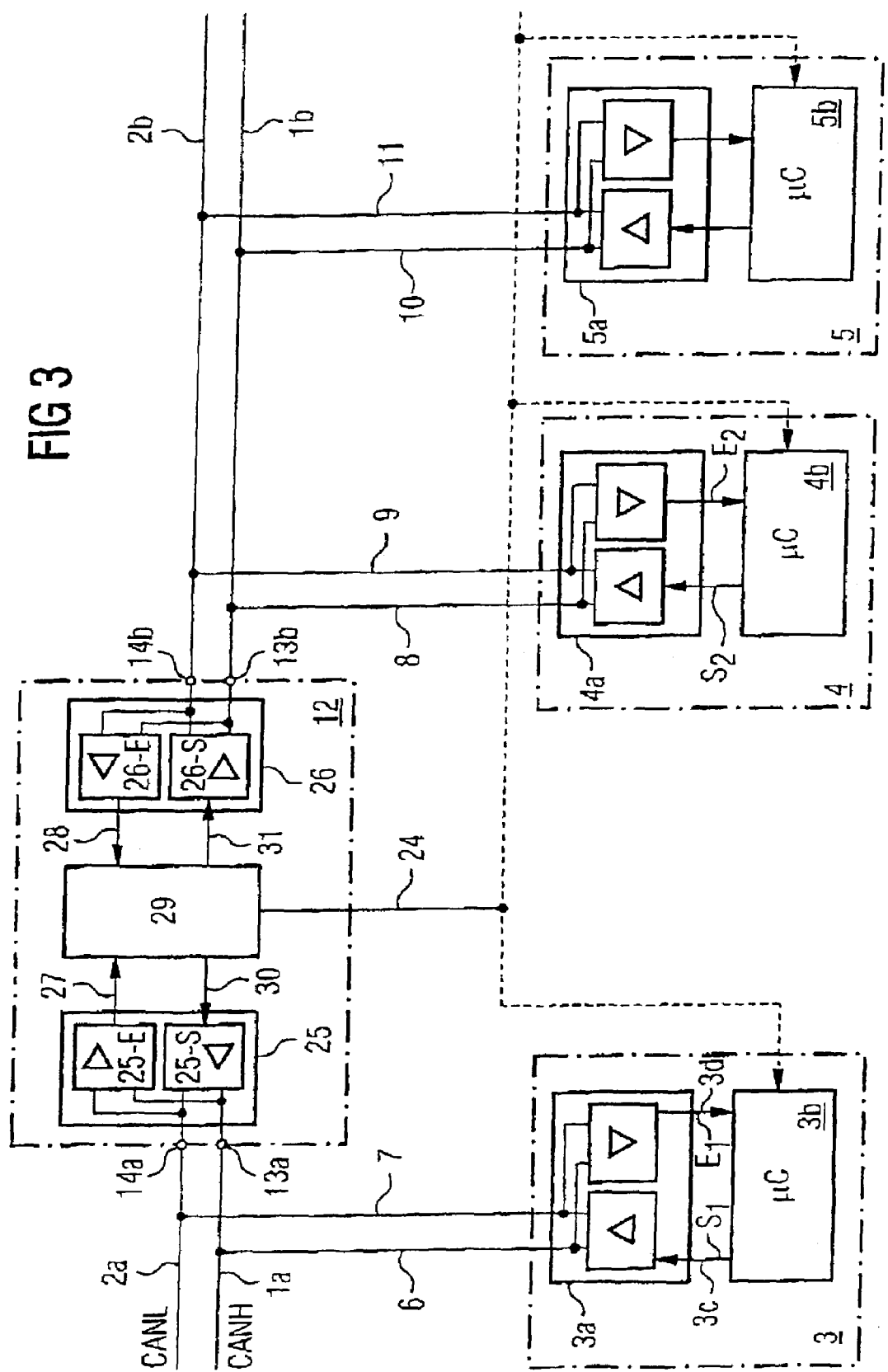
FIG. 3 shows a CAN bus system network with a second embodiment of the inventive protective circuit.

FIG. 3 shows a second embodiment of the inventive protective circuit 12. In the case of the second embodiment of the inventive protective circuit, shown in FIG. 3, the two network sections are not isolated physically by splitting the bus line, but rather are isolated using logic. The protective circuit 12 based on the second embodiment has a first transceiver 25 for connection to the bus lines 1a, 2a in the first network section via the bus line connections 13a, 14a, and also a second transceiver 26 for connection to the bus lines 1b, 2b in the second network section via the bus line connections 13b, 14b. The transceivers 25, 26 each have transceiver transmitter parts 25-S, 26-S and transceiver receiver parts 25-E, 26-E. The two transceiver transmitter parts 25-S, 26-S are connected to a logic isolation circuit 29 via lines 30, 31. The transceiver receiver parts 25-E and 26-E in the two transceivers 25, 26 are connected to the logic isolation circuit 29 via lines 27, 28.

Figure 4:
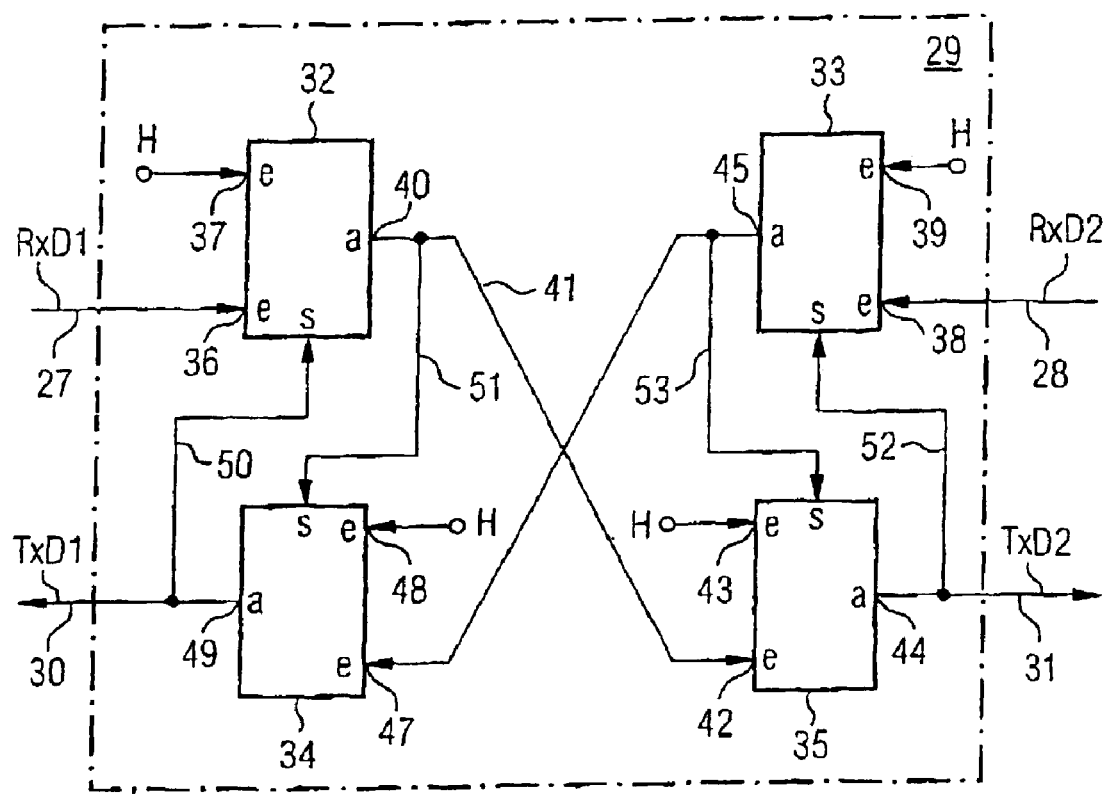
FIG. 4 shows the isolation device for isolating the network sections in the second embodiment of the inventive protective circuit, shown in FIG. 3.

FIG. 4 shows the circuit design of a preferred embodiment of the logic isolation circuit 29 in the case of the second embodiment of the inventive protective circuit 12, as shown in FIG. 3.

The logic isolation circuit 29 preferably contains four multiplexers, namely two reception multiplexers 32, 33 and two transmission multiplexers 34, 35. Each of the multiplexers 32, 33, 34, 35 has two respective signal inputs, a signal output and a control line connection. The first signal input 36 of the reception multiplexer 32 is connected to the transceiver receiver part 25-E via the line 27, with a recessive transmission signal from the access arbitrated bus system network which is to be protected being applied to the second signal input 37.

A CAN network has two transmission signal states, namely a logic high level recessive transmission signal state and a logic low level dominant transmission signal state. In the quiescent state, the logic high level recessive transmission signal state is present on the bus line, while active data transmission uses both the low level dominant transmission signal state and the high level transmission signal state. In a CAN bus system, the second signal input 37 of the reception multiplexer 32 thus has a logically recessive high level transmission signal applied to it which is indicated by a logic H in FIG. 4.

The first signal input 38 of the second reception multiplexer 33 is connected to the transceiver receiver part 26-E via the line 28. The second signal input 39 of the second reception multiplexer 33 likewise has a logically recessive data transmission signal applied to it.

The signal output 40 of the first reception multiplexer 33 is connected via a line 41 to the first signal input 42 of the transmission multiplexer 35, whose second signal input 43 receives a logically recessive transmission signal. The signal output 44 of the transmission multiplexer 35 is connected to the transceiver receiver part 26-S via the line 31.

The signal output 45 of the reception multiplexer 33 is connected via a line 46 to the first signal input 47 of the transmission multiplexer 34, whose second signal input 48 receives a logically recessive transmission signal. The signal output 49 of the transmission multiplexer 34 is connected to the transceiver transmitter part 25-S via the line 30.

The reception multiplexer 32 is switched via a control line 50 which is connected to the output line 30 of the transmission multiplexer 34. The transmission multiplexer 34, for its part, is controlled via a control line 51 which receives the signal produced at the output connection 40 of the reception multiplexer 32 as control signal.

The reception multiplexer 33 is controlled via a control line 52 which is connected to the output connection 44 of the transmission multiplexer 35. The transmission multiplexer 35 receives its control signal via a control line 53 which is connected to the output connection 45 of the reception multiplexer 33.

The reception multiplexer 32 receives a received signal RxD1 from the receiver 25 via the signal line 27. The reception multiplexer 33 receives a received signal RxD2 from the transceiver 26 via the line 28. Conversely, the transmission multiplexer 34 outputs a transmitted signal TxD1 to the transceiver 25 via the line 30, and the transmission multiplexer 35 outputs a transmitted signal TxD2 to the transceiver 26 via the signal line 31.

The table below shows the transmitted and received signals in the logic isolation circuit 29 for the various operating situations B in the bus system.

TABLE 1

| Operating situation B | RxD1 | RxD2 | TxD1 | TxD2 |
|---|---|---|---|---|
| B1 Quiescent state | 1 | 1 | 1 | 1 |
| B2 Transmitter in network section A | 0 | 0 | ① | 0 |
| B3 Transmitter in network section B | 0 | 0 | 0 | ① |
| B4 Transmitter in both network sections | 0 | 0 | ① | ① |
| B5 Fault in network section A | 1/0 | x | ① | ① |
| B6 Fault in network section B | x | 1/0 | ① | ① |

In this context, ① signifies a high level recessive signal which is output in order to prevent a deadlock state. A ⓪ arises as a consequence of the transmission of a dominant bus state.

In operating situation B1, the entire bus system is in the quiescent state. In operating situation B2, a control node in a first network section A is transmitting, so that the reception multiplexer 32 receives via the line 27 a dominant low level transmitted signal 0 which is forwarded via the line 31 as transmitted signal TxD2.

If, conversely, the second network section B is transmitting, the logic isolation circuit 29 receives a logically dominant 0 signal via the circuit 28 and forwards it on the line 30 to the first network section A via the transceiver 25. From the operating situations B4, B5, B6, the two network sections A, B are isolated by logic such that no dominant logic low level data transmission signals are connected by the isolation circuit 29, but instead a blocking signal is inevitably produced. In this case, the signal outputs 44, 49 of the two transmission multiplexers 35, 34 are set to the recessive high level data transmission signal.

The table below shows the transmitted and received signals in a control node 3 in the first network section A and a control node 4 in a second network section B for the various operating situations B.

The control node 3 transmits a transmitted signal $S_1$ and receives a received signal $E_1$. The control node 4 transmits a transmitted signal $S_2$ and receives a received signal $E_2$.

TABLE 2

| Operating situation B | $S_1$ | $S_2$ | $E_1$ | $E_2$ |
|---|---|---|---|---|
| B1 Quiescent state | 1 | 1 | 1 | 1 |
| B2 Transmitter in network section A | 0 | 1 | 0 | 0 |
| B3 Transmitter in network section B | 1 | 0 | 0 | 0 |
| B4 Transmitter in both network sections | 0 | 0 | 0 | 0 |
| B5 Fault in network section A | x | 0/1 | x | $S_2$ |
| B6 Fault in network section B | 0/1 | x | $S_1$ | x |

In one preferred development of the logic isolation circuit 29 shown in FIG. 4, the signal input 42 of the transmission multiplexer 35 is connected to the signal output 40 of the reception multiplexer 32 with DC decoupling. In addition, the first signal input 47 of the transmission multiplexer 34 and the signal output 45 of the reception multiplexer 33 are connected with DC decoupling. In this case, the connecting lines 41, 46 are preferably DC-decoupled by interposed optocouplers. The DC isolation of the two network sections by the optocouplers has the particular advantage that the various network sections can be provided with different supply voltages $V_{BB}$ for the bus lines.

The logic isolation circuit 29 is connected to the control nodes 3, 4, 5 via a fault bus line 24 in order to transmit information data.

As can be seen from FIG. 2 and FIG. 3, both embodiments of the inventive protective circuit are of symmetrical design, which means that the inventive protective circuit 12 can be used in bus lines 1, 2, with the bus line connection 14a being able to be interchanged with the bus line connection 14b, and the bus line connection 13a being able to be interchanged with the bus line connection 13b. Preferably, the bus line connections 13a, 14a and the bus line connections 13b, 14b can also be interchanged when the protective circuit 12 is inserted into the bus system network. This affords the particular advantage of simple assembly.

The inventive protective circuit 12 is distinguished by very low circuit complexity, which facilitates its design using standard chips. The inventive protective circuit can be used universally in all access arbitrated bus system networks, such as a CAN bus system, a J 1850 bus system or a CSMA bus system. It can be interposed at any points within the bus system network. The direct monitoring of the physical level state on the bus lines means that the inventive protective circuit 12 is distinguished by a very short reaction time of less than 10 µs. Another advantage of the inventive protective circuit is that the faulty network section can be located, with this also being communicated to bus system control nodes via a fault bus 24. When the fault state has been terminated, the inventive protective circuit 12 automatically removes the isolation of the network sections again.

The invention claimed is:

1. A protective circuit comprising:
   a first transceiver to connect to a first network section;
   a second transceiver to connect to a second network section; and
   a logic isolation circuit to isolate a network section from a bus system network using logic when a fault state is recognized in the network section, the logic isolation circuit comprising
   a reception multiplexer having a first signal input connected to a first transceiver receiver and a second signal input to receive a logically recessive transmission signal; and
   a transmission multiplexer having a signal output connected to one of the transceiver transmitters and a first signal input connected to a signal output of the reception multiplexer for the transceiver receiver, wherein a logically recessive transmission signal is applied to a second signal input of the transmission multiplexer;
   wherein a first transceiver receiver in the first transceiver recognizes a fault state in the first network section, and a second transceiver receiver in the second transceiver recognizes a fault state in the second network section, and the logic isolation circuit includes logic signal inputs to connect to both receivers and logic signal outputs to connect to transceiver transmitters.

2. The protective circuit of claim 1 wherein the logic isolation circuit blocks a dominant transmission signal from the first network section.

3. The protective circuit of claim 1 wherein the logic isolation circuit blocks a dominant transmission signal to the second network section.

4. The protective circuit of claim 1 further comprising a fault bus to connect the logic isolation circuit to control nodes in the bus system network, wherein the fault bus provides information data to the control nodes indicating that the network section recognized as faulty has been isolated from the bus system network.

5. The protective circuit of claim 1 wherein the first signal inputs of the transmission multiplexers are connected to the signal outputs of the reception multiplexers with DC decoupling.

* * * * *